US006763334B1

(12) United States Patent
Matsumoto et al.

(10) Patent No.: US 6,763,334 B1
(45) Date of Patent: Jul. 13, 2004

(54) SYSTEM AND METHOD OF ARRANGING DELIVERY OF ADVERTISEMENTS OVER A NETWORK SUCH AS THE INTERNET

(75) Inventors: Takuya Matsumoto, Toyonaka (JP); Shiro Kidera, Ebina (JP); Ryuichi Ishii, Yokohama (JP)

(73) Assignee: Action Click Co., Ltd., Tokyo (JP)

( * ) Notice: Subject to any disclaimer, the term of this patent is extended or adjusted under 35 U.S.C. 154(b) by 0 days.

(21) Appl. No.: 09/457,591

(22) Filed: Dec. 9, 1999

(51) Int. Cl.[7] .............................................. G06F 17/60
(52) U.S. Cl. .......................... 705/14; 705/26; 705/27; 709/217
(58) Field of Search .............................. 705/26, 27, 14; 463/41; 709/217

(56) References Cited

U.S. PATENT DOCUMENTS

| 5,724,521 A | * | 3/1998 | Dedrick ...................... 705/26 |
| 5,791,991 A | * | 8/1998 | Small ........................... 463/41 |
| 5,809,242 A | * | 9/1998 | Shaw et al. .................. 709/217 |
| 5,937,390 A | * | 8/1999 | Hyodo ........................ 705/14 |
| 5,991,740 A | | 11/1999 | Messer |

FOREIGN PATENT DOCUMENTS

| JP | 10-254829 | 9/1998 |
| JP | 11-154159 | 6/1999 |
| WO | WO 98/34189 | 8/1998 |

* cited by examiner

*Primary Examiner*—John L. Young
(74) *Attorney, Agent, or Firm*—Rader, Fishman & Grauer PLLC

(57) ABSTRACT

A method and system of arranging advertisements on a network for a potential media owner or affiliate to sell ad space on a network media to an advertiser. The advertiser's conditions and the affiliate's acceptance are made on the network through an agent's server. The server provides an invitation page for entry of the advertiser's conditions. The conditions are disclosed to the affiliate on the network. When the affiliate accepts the conditions on the network, the agent's server responds to make an advertisement contract, and allocates an advertiser's web site to the ad space of the network media. The number of the responses made to the advertisement is counted at the agent's server, which delivers statistical data of the counted responses on the network to the advertiser and the affiliate for determination of the payment and for evaluation of the effectiveness of the advertisement.

26 Claims, 9 Drawing Sheets

FIG. 3

```
Advertiser's Request (Invitaion page)
```

- 20
- 21 Name of Advertiser
- 22 Campaing Objective
- 23 Campaing Period  from ___ to ___

24 Selection of responses | Cost per response
- 25 ☐ Visiting Web site
- ☐ Downloading software
- ☐ Applying for prize
- ☐ Answering questionanaire
- ☐ Requesting catalog
- ☐ Requesting subcription to newsletter
- ☐ Signing up for membershp
- ☐ Ordering a product or service
- ☐ ___
- 26 (cost fields)

27 Maximum respnses per month
28 Catogory of targent group

29 Designation of affiliates   ☐ ALL
30 ☐ XXX   ☐ YYY   ☐ ZZZ
   ☐ QQQ   ☐ SSS   ☐ TTT 31 Copy and Layout of advertisement 32 URL of web site to be linked

FIG. 4

List of intended Advertisements <Offer Page>

To: XXX

| | Advertiser's name | Campaign Objectives | Cost per response (Yen) | Expected Sales (Yen) |
|---|---|---|---|---|
| 1 | ABC | distribution of new catalogue | 100 | 500,000 |
| 2 | ABC | new membership promotion | 120 | 600,000 |
| 3 | DEF | trend survey | 150 | 800,000 |
| 4 | HIJ | new product sales promotion | 200 | 1,200,000 |
| 5 | HIJ | new membership promotion | 100 | 700,000 |
| 6 | LMN | new membership promotion | 1000 | 2,500,000 |
| 7 | LMN | new produt sales promotion | 1500 | 3,300,000 |

Enter number for details ☐

FIG. 5

Detailed Information

*Advertiser's Request (Invitaion page)*

Name of Advertiser
Campaing Objective
Campaing Period   from   to

Selection of responses          Cost per response
☐ Visiting Web site
☐ Downloading software
☐ Applying for prize
☐ Answering questionanaire
☐ Requesting catalog
☐ Requesting subcription to newsletter
☐ Signing up for membershp
☐ Ordering a product or service
☐

Maximum respnses per month
Catogory of targent group

Designation of affiliates   ☐ ALL
☐ XXX   ☐ YYY   ☐ ZZZ
☐ QQQ   ☐ SSS   ☐ TTT

Copy and Layout of advertisement

URL of web site to be linked

Agreement for sales

Date:   yyyy/mm/dd
Ad space type
Affiliate code

FIG. 6

Administer Page

80 — To(Advertiser): ABC
Campaign Objective: distribution of new catalogue
Campaign Code: ABCXYZ 81 — Period:
- ☐ Whole
- ☐ Specify   from: [        ]   to: [        ]

82 — Download of log files:
- ☐ entrance page 
- ☐ action page <action acess number>
- ☐ action proces <result number>

83 — [Download]

84 — View Statistic:
- ☐ sort on APID
- ☐ sort on referring page

85 — [View]

FIG. 7

Statistical Report <FORM 1A>

To(Advertiser ): ABC

Campaign Objective: distribution of new catalogue

Campaign Code: ABCXYZ

Period: from 1999.11.10 to 1999.12.15

[Download]

| Date | Page Access number | Action Acess number | | Result number | |
|---|---|---|---|---|---|
| Total | 18692 | 11684 | 61.61% | 4719 | 24.88% |
| 11/10 | 1000 | 700 | 70.00% | 300 | 30.00% |
| 11/11 | 1200 | 800 | 66.66% | 450 | 37.50% |
| 11/12 | 1100 | 700 | 63.63% | 400 | 36.36% |
| 11/13 | 2000 | 1000 | 50.00% | 800 | 40.00% |
| 11/14 | 1500 | 850 | 56.67% | 630 | 42.00% |
| | | | | | |
| | | | | | |
| | | | | | |
| | | | | | |
| | | | | | |

Next ⇨ Top

FIG. 8

| Administer Page |
|---|
| To(Affiliate ):XXX |

90

91 — Period:
- ☐ Whole
- ☐ Specify   from: [____] to: [____]

92 — Download of log files:
- ☐ entrance page  <page access number>
- ☐ action page   <action acess number>
- ☐ action proces  <result number>

93 — [Download]

94 — View Statistic:
- ☐ sort on Advertisers
- ☐ sort on APID

95 — [View]

FIG. 9

Statistical Report <FORM 1B>

To(Affiliate ): XXX

Period: from 1999.11.10 to 1999.12.15

[Download]

| Advertisers | Page Access number | Action Access number | | Result number | |
|---|---|---|---|---|---|
| ABC | 14900 | 11100 | 74.49% | 9400 | 63.08% |
| DEF | 3000 | 2200 | 73.33% | 1900 | 63.33% |
| | | | | | |
| | | | | | |
| | | | | | |
| | | | | | |
| | | | | | |
| | | | | | |
| | | | | | |
| | | | | | |
| | | | | | |

Next ⇨ Top

SYSTEM AND METHOD OF ARRANGING DELIVERY OF ADVERTISEMENTS OVER A NETWORK SUCH AS THE INTERNET

BACKGROUND OF THE INVENTION

1. Field of the Invention

The present invention is directed to a system and method of arranging delivery of advertisements over a network such as the Internet.

2. Background Art

There have been proposed prior systems and methods of arranging the advertisement over the Internet between advertisers and media owners. The methods offer to the advertisers to buy ad space of the media owners on a pay-per-click or a pay-per-action basis. The Internet advertisement carries a vast number of different campaigns that attract prospective Internet users in different ways or expect different user's action. So, the advertisers and the media owners are looking for the measure for effectiveness of the campaign over the Internet which is not simply relying upon the cost-per-click or cost-per-action. In view of the above potential demands of the advertisers, the inventors have sought to provide a consistent scheme which enables an agent to arrange the advertisement between the advertisers and the media owners with optimized conditions beneficial to the both parties.

SUMMARY OF THE INVENTION

The present invention has been accomplished to present a unique method and system which is capable of arranging the advertisement in such a manner as to satisfy varying requirements of the advertisers for effective return from the advertisements, which is therefore a primary object of the present invention. The system in accordance with the present invention includes an agent's server provided with an invitation module, an offer module, and an arrangement module.

The invitation module is programmed to provide an invitation page on the network for inviting potential advertisers having an advertiser's own web site to place an intended advertisement on the network media. The invitation page includes a condition form for entry of specific conditions that the advertiser requests for the proposed advertisement. The condition form has a selection box listing defined responses expected to be made by a prospective user as a consequence of the advertisement so that the advertiser can select at the selection box one or more of the responses to be included in the conditions. Also, the condition form has a cost per response entry to be entered by the advertiser as indicating a unit cost payable for each response selected.

The offer module is programmed to, based on a reply from the advertisers, makes an ad schedule listing the intended advertisements with the specific conditions. The offer module provides an offer page which discloses the ad schedule over the network to a potential media owner or affiliate having a network medium so that the affiliate can determine whether or not to place the advertisement on an ad space of the network media in agreement on the specific conditions prescribed in the ad schedule. The offer page includes an agreement entry which instructs the affiliate to enter an acceptance for selling the ad space for the advertisement.

The arrangement module is programmed to make an advertisement contract between the advertiser and the affiliate upon receipt of the acceptance only from the affiliate, and allocates the advertiser's web site to the ad space of the network media placing the advertisement thereon.

The agent's server includes a response measurement module which is programmed to count the number of specific responses made at the advertiser's web site through the ad space. Further, included in the server is an administration module which is programmed to provide a statistical report over the Internet for furnishing the advertiser with an analysis of the responses being counted so that the advertiser can estimate the effectiveness of the advertisement.

Accordingly, it is possible with this system to select an optimum response expected by the user which is effective for the advertisement and beneficial to the affiliate. In addition, any suitable combination of the responses can be selected for consistent with varying interests of the advertisers.

The specifically defined responses includes visiting the advertiser's web site; downloading a file or software from the advertiser's web site; applying for a prize offered by the advertiser on the advertiser's web site; answering to a questionnaire from the advertiser on the web site; requesting a catalogue from the advertiser through the advertiser's web site; requesting subscription to a newsletter; signing up a membership of a club managed on the advertiser's web site; and ordering a product or service on the advertisers web site.

The system is specifically adapted for the advertiser's web site which includes an entrance page destined from the ad space for guiding the user first, an action page designated in the entrance page and requiring entry of information or reply by the user before requesting a result of the specified response, and an action process module which responds to the specific response for processing the same. In association with these pages and module, the measurement module is configured to have an index CGI, an action CGI, and a result CGI. The arrangement module prepares an index URL, an action URL, and a result URL upon establishment of the advertisement contract in order to make a definite interrelation of the pages and the module of the advertiser's web site with the agent's server for collecting data and counts of the specific responses for each of the advertisements.

The index URL, which identifies a URL of the index CGI and includes an ad code assigned to the advertisement, is embedded in the ad space for linking the ad space to the index CGI. The action URL identifies a URL of the action CGI and is embedded in the entrance page for linking the entrance page to the action CGI. The result URL identifies a URL of the result CGI and is embedded in the action page for linking the action page to the action CGI.

The index CGI is also linked to an index log file which stores index data with regard to the user requesting access to the entrance page. The index data include:

1) date and time of the user requesting for access to the entrance page;
2) a referrer log showing data of at least the ad space from which the user makes the request for access to the entrance page of the advertisers web site; and
3) the ad code.

The arrangement module also functions to locate an entrance page URL of the entrance page based upon the ad cod received at the index CGI by reference to a database table storing various ad codes in relation to various entrance page URLs. The arrangement module passes the located entrance page URL to the index CGI which responds to redirect the user's request made at the ad space to the entrance page immediately after storing the index data in the index log file.

The action CGI is also linked to an action log file which stores action access data with regard to the user requesting for access to the action page. The action access data includes:

1) date and time of the user requesting for access to the action page; and
2) a referrer log showing data of at least the ad space from which the user is led to the action page.

The arrangement module functions to locate an action page URL of the action page by collation of the data of the ad space received at the index CGI with data of the ad space received at the action CGI and by reference to the table storing the various ad codes in relation to various action page URLs. The arrangement module then passes thus located action page URL to the action CGI which responds to redirect the user's request at the entrance page to the action page immediately after storing the action access data in the action log file.

The result CGI is also linked to a result log file which stores action process data with regard to the user requesting the processing at the action process module. The action process data include:

1) date and time of the user requesting an access to the action process module; and
2) a referrer log showing data of at least the ad space from which the user is led to the action process module.

The arrangement module locates an action process URL of the action page by collation of the data of the ad space received at the index CGI with data of the ad space received at the result CGI and by reference to the table storing the various ad codes in relation to various action process URLs. Then, the arrangement module passes thus located particular action process URL to the result CGI which responds to redirect the user's request at the action page to the action process module immediately after storing the action process data in the result log file.

Thus, it is readily possible to correlate the particular advertisement to the entrance page the action page and the action process page of the associated advertiser's web sites for obtaining statistical data for each advertisement with regard to the number of the accesses to the entrance page, the number of the access to the action page, and the number of requesting for the action process.

The present invention also provides a unique method comprising the following steps of:

providing an invitation page over the network for inviting potential advertisers each having an advertiser's web site to place an advertisement on the network with a condition form to specify conditions for the advertisement, the condition form having a list of defined responses expected to be made by a prospective network user in reply to the advertisement so that the advertiser can select at least one of the responses to be included in the conditions, the condition form having a cost per response entry to be filled by the advertiser as indicating a unit cost payable for the response selected, and having a media entry for designating a desired network media on which the advertisement is intended to be placed on;

receiving a reply to the invitation page from the advertiser and making therefrom an ad schedule with specific conditions for the advertisement;

providing an offer page which discloses the ad schedule on the network to a potential affiliate administering a network medium so that the affiliate can determine to place the advertisement on an ad space of the network media in agreement on the specific conditions mentioned in the ad schedule, the offer page including an agreement entry which instructs the affiliate to enter an acceptance for selling the ad space to the advertiser;

establishing an advertisement contract between the advertiser and the affiliate immediately upon receipt of the acceptance and delivering a confirmation of the contract to the advertiser and the affiliate;

allocating the advertiser's web site to the ad space in the network media placing the advertisement in order to count the number of the responses made through the ad space to the advertiser's web site during a predetermined period of time; and delivering data of the responses counted over the network for access by the advertiser as well as by the affiliate so that the advertiser can evaluate the effect of the advertisement and that the affiliate can charge the advertiser for the advertisement based upon the data.

Thus, the matching of the advertiser with the affiliate can be easy to accomplished on the network, and the advertisement contract can be made simply at the discretion of the affiliate for prompting the advertisement.

These and still other objects and advantageous features of the present invention will become more apparent from the following description of the preferred embodiment when taken in conjunction with the attached drawings.

BRIEF DESCRIPTION OF THE DRAWINGS.

FIG. 3 is a view of an invitation page utilized in the above system;

FIG. 4 is a view of an offer page utilized in the above system;

FIG. 5 is a view of a part of the offer page;

FIG. 6 is a view of an administer page for an advertiser utilized in the above system;

FIG. 7 is a view of a statistical report issued to the advertiser;

FIG. 8 is a view of an administer page for an affiliate utilized in the above system; and FIG. 9 is a view of a statistical report issued to the affiliate;

DETAILED DESCRIPTION OF THE EMBODIMENT

Figure 1:
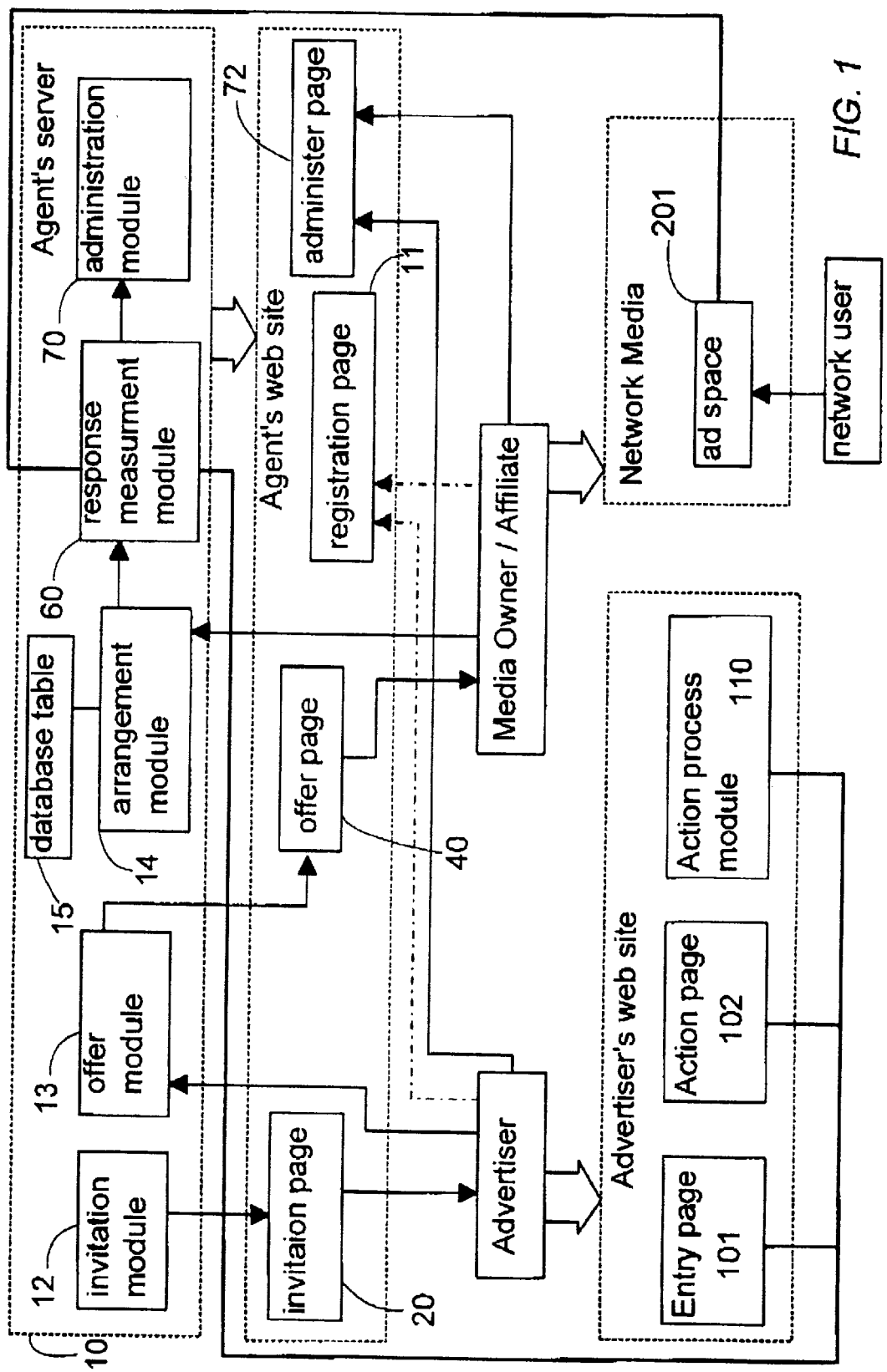
FIG. 1 is a block diagram illustrating a system of arranging the delivery of advertisements over a network in accordance with a preferred embodiment of the present invention.
Figure 2:
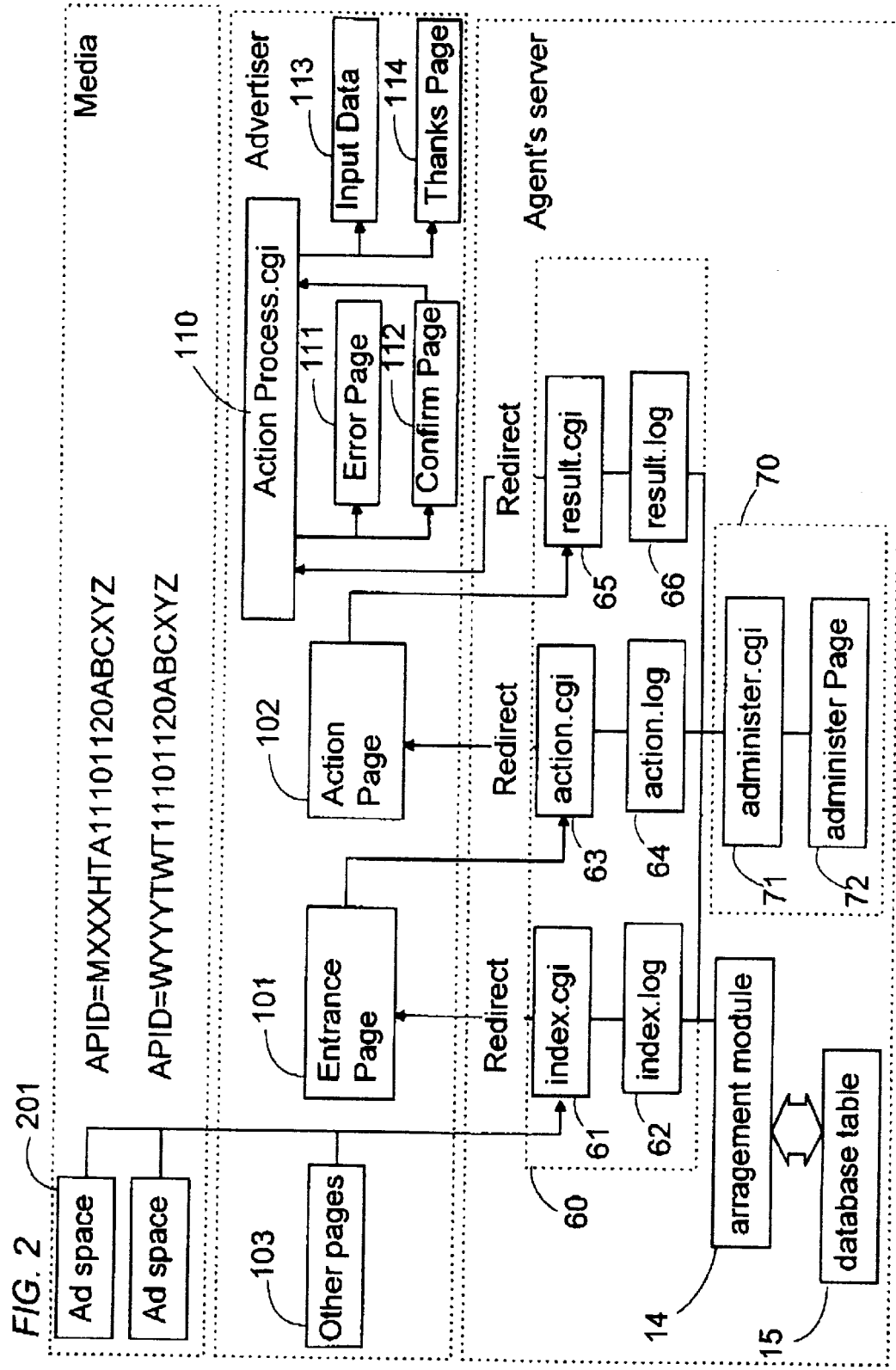
FIG. 2 is another block diagram illustrating the above system.

FIGS. 1 and 2 illustrate a system of arranging the delivery of advertisements over a network in accordance with a preferred embodiment of the present invention. The system is managed by an agent having an agent's server 10 for arranging the delivery of the advertisements intended by advertisers over the network such as the Internet to media owners, i.e., potential affiliates having their own network medium such as a mailing magazine, an opt-in mailing service, a web-site or any other network media affording ad spaces 201, i.e., spaces for sale for advertisement such as an add expression and an ad banner. The advertiser is defined to have its own web site where the network users can access for obtaining information about services and products of the advertiser. The server 10 communicates over the network with the advertisers as well as with the affiliates so that the affiliate can determine whether or not to place the Intended advertisement on its network media.

The advertisers and the affiliates are limited to those who have already registered with the system and are given therefrom individual IDs and passwords for access to the system. At the registration, the advertisers and the affiliates are requested to provide their corporate details to a registration page 11 on a web site provided by the server 10. Based upon the details thus provided, the agent' server 10 prepares groups of the registered advertisers and affiliates with whom the server 10 communicates over the network.

In order to make a matching of the advertisers' proposals with the affiliates' interest, the agent's server 10 collects requests for different advertisements and offers the advertisers' requests to the affiliates. For this purpose, the agent's server 10 includes an invitation module 12 which provides on its web site an invitation page 20 for access by the advertisers and an offer page 40 for access by the affiliates. The invitation page 20 collects conditions for placement of an intended advertisement with respect to a particular campaign by the advertiser and other information requested by the advertiser for the campaign.

The conditions include a selection of one or more from defined responses expected by the network users as a consequence of the advertisement and a cost per response payable to the affiliate. The defined responses are 1) visiting or clicking through the advertiser's web site
2) downloading a file or software from the advertiser's web site;
3) applying for a prize offered by the advertiser on the advertiser's web site;
4) answering a questionnaire from the advertiser;
5) requesting a catalog from the advertiser through the advertiser's web site;
6) requesting subscription to a newsletter from the advertiser's web site;
7) signing up for a membership of a club managed on the advertiser's web site;
8) ordering a product or service at the advertiser's web site; and
9) any other positive action that requires a reaction from the advertiser.

The information includes, for example, i) campaign objective;
ii) maximum counts of response per a predetermined period of time;
iii) category of target network users:
iv) desired media;
v) requested advertising period
vi) advertising content
vii) URL of the advertiser's web site.

The above conditions and information are entered by the advertisers on the invitation page 20, one exemplary format of which is shown in FIG. 3. The page includes a name entry 21 for the name of the advertiser, a campaign entry 22 for a campaign objective, a campaign period entry 23 for starting and ending date of the campaign, a selection box 24 for selection of defined responses, an entry 27 for the number of maximum responses per month to be paid for, an entry 28 for category of target group, a designation box 29 for designation of desired affiliate, a layout entry 31 for text and image of the advertisement, and a URL entry 32 for URL of the advertiser's web site to be linked to the advertisement. The selection box 24 lists the defined responses each associated with checkbox 25 and a cost per response entry 26 so that the advertiser can select one or more of the responses by simply marking the corresponding checkbox and inputting a bid at the cost per response. At the designation box 29, the advertiser is prompted to select the individual medium or all of the listed media by simply checking the corresponding checkboxes 30.

Upon completion of the invitation page 20 by the advertiser, the agent's server 10 responds to create a campaign code of six uppercase letters. First three letters of the campaign code are chosen to identify the advertiser's name, and the last three letters are chosen to identify a particular product or service of the advertisers. For instance, campaign code of "ABCXYZ" indicates the advertisement by the advertiser having a corporate code of "ABC" for the particular product or service assigned to a brand code "XYZ". Thus, different campaigns by the same advertiser can be well discriminated from each other in the system. The corporate code of the advertiser is assigned to the advertiser at the time of subscription to the system, while the brand code is assigned each time of completing the invitation page 20.

The conditions and information provided by the advertisers are received at an offer module 13 in the server 10 to make up the offer pages 40 listing the intended advertisements for the advertiser. The offer pages 40 are prepared for the different affiliates designated. The individual offer pages 40 are placed on the agent's web site so that the designated affiliates can access only to the corresponding offer pages 40 prepared for that affiliates. One example of the offer page 40 is shown in FIG. 4 which includes a list 41 of the intended advertisements designating the affiliate allowed to access this page. The list includes the advertiser's name, campaign objects, cost per response, and an expected sales which is obtained from analysis of previous statistical data accumulated in the agent's server 10. When no relevant statistical data is available, the expected sales is left blank. The offer page 40 includes an entry 42 for further review of the details of the intended advertisement and a detailed information page 50. By putting a corresponding listing number into the entry 42, a display is jumped to the detailed information page 60 which, as shown in FIG. 5, reproduces the invitation page 30 and includes an agreement section 51 with entries 52, 53, and 54 for prompting entries of date (yyyy/mm/dd), type of the ad space 201 prepared for the advertisement, and an affiliate code assigned to the affiliate at the time of subscription to the system. The type of the ad space is designated by an ad space code of 3 upper-case letters chosen from a table included in a manual delivered to the affiliate at the time of subscription to the system. The table shown below is one example for the ad space code.

| Ad space code | Designation |
| --- | --- |
| HTA | Header text Advertisement (Mail magazine) |
| TWT | Top page of Web site in Text format |
| CWB | at Category of Web site in Banner format |

The offer page 40 and the information page 50 provide sufficient information so that the affiliate can decide, in consideration of the information together with the users demographics of the affiliate's medium, which ad space 201 to place the advertisement. When the affiliate accepts the conditions proposed by the advertiser through the offer page 40, the affiliate is only required to complete the agreement section 51. The reply from the offer page 40 is then sent back to arrangement module 14 of the agent's server 10, which responds to establish an advertisement contract between the affiliate and the advertiser, and delivers a confirmation notice of the contract to the advertiser and the affiliate by way of e-mail. The confirmation notice includes an actual period between starting and ending the placement of the advertisement on the ad space 201 and a media indicator. The media indicator indicates the type of network media, such as the mailing magazine, the opt-in mailing service, the web-site and the like affording the ad spaces. For example, the mailing magazine is designated by a letter of 'M', the opt-in mailing service is by a letter of 'O', and the web-site is by a letter of 'W'. These letters are assigned to the corresponding media and acknowledged by the agent's server when the affiliates makes registration to the system.

The arrangement module 14 creates an ad placement identification code (APID), upon completion of the agreement section 51 by the affiliate, for identification of the particular advertisement campaign and the affiliate placing the advertisement. The APID includes a media code plus a period code and the campaign code. The media code is composed of the single letter indicative of the type of the media, plus the affiliate code and the ad space code, while the period code is defined by 8-digits numerals for indication of starting and ending the advertisement. That is, the APID of "MXXXHTA11101120ABCXYZ" indicates that the media type is the mail magazine by the first letter of 'M'; the media name is represented by the media code of "XXX" of the subsequent 3 letters;

the ad space type is represented by the ad space code "HTA" of the subsequent 3 letters;

the starting date of advertisement is November 10 by the subsequent 4 digits "1110";

the ending date of advertisement is November 20 by the subsequent 4 digits "1120";

the advertisers name is represented by the corporate code of "ABC" of the subsequent 3 letters; and the brand or service is represented by the brand code of "XYZ" of the last 3 letters.

Likewise, APID of "WYYYTWT11101120ABCXYZ" indicates the same advertisement campaign for the same period but at the different ad space of the different affiliate, i.e. at the ad space represented by "TWT" sold by the affiliate whose name is represented by the affiliate code "YYY".

The APID thus created is stored in a database table 15 in the server 10 for administration of the advertisement campaign by the agent. In an exact sense, the advertisement contract is deemed to be established at this time of storing the APID in the database.

Then, the arrangement module 14 allocates the ad space 201 to defined pages of the advertiser's web site through the agent's server 10. The defined pages are an entrance page 101 which is initially visited by the user from the ad space 201 and an action page 102 which induces the user's response selected by the advertiser to be paid for.

The following description illustrates a case where the advertisers exclude the user's response of mere visiting the entrance page from the response to be paid for. That is, the defined responses to be paid for are limited to:

1) downloading a file or software from the advertiser's web site;

2) applying for a prize offered by the advertiser on the advertiser's web site;

3) answering a questionnaire from the advertiser;

4) requesting a catalog from the advertiser through the advertisers web site;

5) requesting subscription to a newsletter from the advertiser's web site;

6) signing up for a membership of a club managed on the advertiser's web site;

7) ordering a product or service at the advertiser's web site; and 8) any other positive action that requires a reaction from the advertiser.

In this sense, the action page 102 includes an action prompt proposing the defined responses selected from the above. Accordingly, in the following description, the term "action" refers to the response selected by the advertiser to be paid for in order to exclude a simple user's response of visiting the entrance page from the user's positive actions which necessitates the advertiser to answer the action and for which the cost is paid. The advertiser's web site further includes an action process CGI (common gateway interface) 110 which is a module programmed to answer the particular action made at the action page 102. The action process CGI 110 is operatively coupled to an error page 111 checking an error in answering the action, a confirm page 112 verifying the action for processing the action, an input data 113 storing the user's information carried by the action, and a thanks page 114 for sending back acknowledgements to the user.

The arrangement module 14 generates an index URL which guides the user clicking on the ad space 201 to the entrance page 101 of the advertiser's web site through the agent's server 10 for monitoring the user's access induced by the advertisement. The index URL includes a statement identifying the advertiser's name, the agent, and the APID. The index URL is embedded in the ad space 201 so that an index CGI 61 of the agent's server 10 catches the information of the user clicking on the ad space 201, in addition to the advertiser's name and the APID. One example of the index URL is as follows:

http://www.actionclic.net/cgi-bin/clientname/index.cgi? MXXXHTA11101120ABCXYZ where "www.actionclic.net/cgi-bin" designates the agent's server;

"clientname" designates the advertiser's name;

"index.cgi" designates the index CGI;

? is a parameter indicator; and

"MXXXHTA11101120ABCXYZ" is a parameter designating the APID.

Based upon the advertiser's name and the APID received at index CGI 61, the arrangement module 14 identifies an entrance page URL of the entrance page 101 with reference to the database table 15. Thus, index CGI 61 is enabled to redirect the user's response to the entrance page 101 of the advertiser's web site immediately after receiving the information. Some of the information received at index CGI 61 is stored in an index log file 62 for analysis of the user's behavior as will be discussed hereinafter. Such information includes:

date and time of the user requesting for access to the entrance page;

a referrer log showing all referring pages from which the user is led to entrance page;

APID; and optionally user's IP address.

Also upon establishment of the advertisement contract, the arrangement module 14 prepares an action URL and a result URL for linking the entrance page 101 and the action page 102 respectively to an action CGI 63 and result CGI 64 of the agent's server 10. Action URL is embedded in a guide object appearing in the entrance page 101 for inviting the user to the action page 102 and directing the user's response through action CGI 63 to the action page 102. One example of action URL is as follows:

http://www.actionclic.net/cgi-bin/clientname/action.cgi where

"www.actionclic.net/cgi-bin" designates the agent's server;

"clientname" designates the advertiser's name; and

"action.cgi" designates the action CGI.

Action CGI 63 catches the information resulting from the user's clicking or the like response to the guide object of the entrance page 101 and stores the information in an action log file 64. The information includes:

date and time of the user requesting for access to the action page;

a referrer log showing all referring pages from which the user is led to the action page; and optionally user's IP address.

The data of referring pages are then collated with those obtained at index CGI 61 to identify the origin of the response, i.e., APID since the referring pages carry the index URL of the ad space 201 which is the key for identification of the origin of the response. From this identification, action CGI 63 retrieves an action page URL of the action page 102 and redirects the user's response to the action page 102. Data of the information received at action CGI 63 are stored in an action log file 64 with the APID identified.

The result URL is embedded in an action object which is inserted in the action page 102 for access by the user to require one of the defined responses or actions that the advertiser selected to pay for. Further, with action process URL, the user's action made to the action object is directed to the action process CGI 110 through a result CGI 65 of the agent's server 10 for collecting data of the user's action made to the defined response. One example of result URL is as follows:

http://www.actionclic.net/cgi-bin/clientname/result.cgi where

"www.actionclic.net/cgi-bin" designates the agent's server;

"clientname" designates the advertiser's name; and

"result.cgi" designates the result CGI.

Result CGI 65 catches the information resulting from the user's clicking or the like response to the action object of the action page 102 and stores the information in an result log file 66. The information includes:

date and time of the user making the defined action on the action page;

a referrer log showing all referring pages from which the user is led to action process CGI; and optionally user's IP address.

The data of referring pages are then collated with those obtained at index CGI 61 to identify the origin of the response, i.e., APID as discussed in the above. From this identification, result CGI 65 retrieves an action process URL of the action process CGI 110 and redirects the user's response thereto. Data of the information received at result CGI 65 are stored in a result log file 66 with the APID identified. The action process CGI 110 responds to give the required answer directly to the user and not through the agent's server.

Since the advertiser's web site may have other pages 103 not linked to the agent's server 10, it is possible that the user jumps to the entrance page 101 or action page 102 from the other pages and not from the ad space 201. In this condition, index CGI cannot fetch APID and therefore no APID code is stored in either of the log files 62, 64, and 66. Thus, the absence of APID can makes it possible to discriminate such actions from those originated from the ad space 201 which is to be paid for.

The index CGI 61, action CGI 63, result CGI 65 and the associated log files are cooperative to form a response measurement module 60 for providing data of the user's responses or actions induced by the advertisement on the ad space 201. The database table 15 stores the individual APID, the advertiser's name, the advertisers code, the URLs of the entrance page 101, action page 102, action process CGI 120 of the advertiser's web site, the affiliate's code, the affiliate's name, passwords and IDs for the advertisers and the affiliates, cost per response determined by the advertiser, and the other fields for providing corresponding data or relation between these fields in answer to inquires from the arrangement module 14 or the other modules of the agent's server.

It is noted in this connection that the response measurement module may include one or more additional result CGIs may be included together with complementary result log files and result URLs when the advertisers selects more than one defined responses to be paid for. The additional result CGI is linked to the action page 102 by way of corresponding result URL so as to count the additional user's response or action made at the action page 102 for storing the additional action process data to the corresponding result log file.

Further included in the server 10 is an administration module 70 having an administer CGI 71 and provides an administer page 72 on the agent's web site. The administer CGI 71 is coupled to the index log file 62, action log file 64, and result log file 66 to collect the data therefrom and prepare statistical data with regard to the responses or actions counted at the response measurement module 60. The statistical data are disclosed in the administer page 72 in various report forms selectively to the advertisers and the affiliates allowed to access. The statistical data include:

1) a page access number which is the number of the accesses to the entrance page of the advertiser's web site during a predetermined period of time;

2) an action access number which is the number of accesses to the action page during the above period of time, 3) a result number which is the number of the actions made in response to the action object for necessitating the processing at the action process CGI during the above period of time;

4) a proceeder rate which is the ratio of the action access number to the page access number;

5) a completer rate which is the ratio of the result number to page access number, and 6) a cost table showing a cost payable for the affiliate or for the agent with regard to the actions counted during a predetermined period of time.

The cost is calculated from the counted action and the cost per response determined by the advertiser and stored in the database table 15 as related to the selected action.

The report forms are classified into a first report format directed to the advertisers and a second report format directed to the affiliates. The first report format includes:

a) a listing of counted responses on a dairy basis;

b) a listing of APID (ad spaces) in order of counted responses; and c) a listing of any one of the referring pages in order of counted responses for all or any combination of the above statistical data.

The second report format includes:

a) a listing of the advertisers in order of counted responses for all or any combination of the above listed statistical data; and b) a listing of APID (ad spaces) in order of counted responses for all or any combination of the above statistical data.

Selection of the formats is made at the administer page. Also, the administer page 72 includes a button which enables the advertiser and the affiliate to download data of the log files 62, 64, and 66 limited to those concerned.

Based upon the statistical report prepared for the individual advertisers and the affiliates, the advertiser can evaluate the effectiveness of the advetisement and the affiliate can charge the advertiser.

FIG. 6 shows one example of the report form 80 displayed on the administer page 72 for limited access by the advertiser. The report form includes a period entry 81 for selecting the whole available period or a certain period of the accumulated data in the agent's server 10. Download section 82 is provided to download data of any one of selected log files 62, 64, and 66. Clicking a download button 83 starts up downloading of the log file data to the advertirser. Further, a view-report section 84 is provided to display the statistical data sorted on the selected items, i.e., APID and referring pages. Clicking on a view button 85 causes a display jump to a statistical report page 86 as shown in FIG. 7, The report page 86 includes a table 87 showing the statistical data on a dairy basis with a row of the total of page access number, action access number, result number, proceeder rate, and completer rate. The report page 86 also includes a download button 88 which enables the advertiser to download the displayed data.

FIG. 8 shows one example of the report form 90 displayed on the administer page 72 for limited access by the affiliate. The report form 90 includes a period entry 91 for selecting whole available period or a certain period of the accumulated data in the agent's server 10. Download section 92 is provided to download data of any one of selected log files 62, 64, and 66. Clicking on a download button 93 starts up downloading of the log file data to the affiliate. Further, a view-report section 94 is provided to display the statistical data sorted on the selected items, i.e., the advertiser's name and APID. Clicking on a view button 95 causes a display to jump to a statistical report page 96 as shown in FIG. 9. The report page 96 includes a table 97 showing the statistical data including page access number, action access number, result number, proceeder rate, and completer rate with regard to the different advertisers. The report page 96 also includes a download button 98 which enables the advertiser to download the displayed data.

It is noted in this connection that the above statistical data may be presented to the advertiser in another report form which lists a ranking of the affiliates in order of counted responses.

LIST OF REFERENCE NUMERALS

| 10 | agent's server | 66 | result log file |
|---|---|---|---|
| 11 | invitation module | | |
| 12 | offer module | 70 | administration module |
| 14 | arrangement module | 71 | administer CGI |
| 15 | database table | 72 | administer page |
| 20 | invitation page | 80 | report form |
| 21 | name entry | 81 | period entry |
| 22 | campaign entry | 82 | download section |
| 23 | campaign period entry | 83 | download button |
| 24 | selection box | 84 | view-report section |
| 25 | checkbox | 85 | view button |
| 26 | cost per response entry | 86 | report page |
| 27 | entry | 87 | table |
| 28 | entry | 88 | download button |
| 29 | designation box | | |
| 30 | checkbox | 90 | report form |
| 31 | copy entry | 91 | period entry |
| 32 | URL entry | 92 | download section |
| | | 93 | download button |
| 40 | offer page | 94 | view-report section |
| 41 | list of advertisements | 95 | view button |
| 42 | entry | 96 | statistical report page |
| | | 97 | table |
| 50 | information page | 98 | download button |
| 51 | agreement section | | |
| 52 | date entry | 101 | entrance page |
| 53 | ad space type entry | 102 | action page |
| 54 | affiliate code entry | | |
| | | 110 | action process CGI |
| 60 | response measurement module | 111 | error page |
| 61 | index CGI | 112 | confirm page |
| 62 | index log file | 113 | input data |
| 63 | action CGI | 114 | thanks page |
| 64 | action log file | | |
| 65 | result CGI | 201 | ad space |

What is claimed is:

1. A system of arranging the delivery of advertisements over a network, an agent managing said system, said system having an agent's server that comprises:

an invitation module, said invitation module providing an invitation page on said network, said invitation page inviting a potential advertiser to place an intended advertisement on said network, said advertiser having a web site, said invitation page including a condition form, said advertiser providing at least one entry into said condition form to specify conditions of said intended advertisement, said condition form having a selection box of defined responses to be made by a user of said network as a consequence of the intended advertisement so that the advertiser can select at least one of said defined responses at said selection box, said at least one of said defined responses to be included in said conditions, said condition form having a cost per response entry to be entered by the advertiser, said cost per response entry indicating a unit cost payable for the response selected;

an offer module, said offer module making an ad schedule listing the intended advertisement with the specific conditions, said specific conditions being based upon a reply to said invitation page from the advertiser, said offer module providing an offer page, said offer page disclosing said ad schedule on the network to a potential affiliate so that the affiliate can determine to place the intended advertisement on an ad space of a network medium in agreement on the specific conditions prescribed in said ad schedule, said affiliate administering said network medium, said offer page including an agreement entry, said agreement entry instructing the affiliate to enter an acceptance for selling the ad space to the advertiser;

an arrangement module, said arrangement module establishing an advertisement contract between the advertiser and the affiliate upon receipt of said acceptance from the affiliate, said arrangement module allocating said web site to said ad space of said network by placing the intended advertisement thereon;

a response measurement module, said response measurement module counting the number of specific responses made at the web site through said ad space; and an administration module, said administration module making a statistical report for analysis of the counted responses and delivering the statistical report through said agent's server to the advertiser so that the advertiser can estimate the effectiveness of the intended advertisement, wherein said web site includes an entrance page that is linked from said ad space, an action page that is linked from the entrance page and where the user may proceed to make at least one specific action of said defined responses, and an action process module that responds to said specific action for processing the same, wherein said administration module produces the statistical report listing a page access number that is the number of the accesses to the entrance page of the web site during a predetermined period of time, an action access number that is the number of accesses to said action page, and a result number that is the number of the access to said action process module, wherein the statistical report includes a proceeder rate, which is the ratio of the action access number to said page access number, and completer rate, which is the ratio of the result number to said page access number.

2. The system as set forth in claim 1, wherein said defined responses made by the users include:

clicking through to said web site downloading a file or software from the web site;

applying for a prize offered by the advertiser on the web site;

answering to a questionnaire from the advertiser on the web site;

requesting a catalogue from the advertiser through the web site;

requesting a subscription to a newsletter from the web site;

signing up a membership of a club managed by the advertisers through the web site; and ordering a product or service through the web site.

3. The system as set forth in claim 1, wherein said clicking through to said web site is excluded from said responses to be paid for.

4. The system as set forth in claim 1, wherein said cost per response entry is programmed to receive different costs for differing responses selected by the advertiser.

5. The system as set forth in claim 1, wherein said statistical report including a table showing a ratio of the number of the responses counted to the number of visits to the web site.

6. The system as set forth in claim 1, wherein said condition form has, in addition to said selection box and said cost per response entry, information entries to be entered by the advertiser for items which include:

campaign objective;

maximum counts of responses per a predetermined period of time;

category of target group;

desired media;

requested advertising time period advertising content URL of the web site.

7. The system as set forth in claim 1, wherein said response measurement module of the agent's server being provided with an index CGI, an action CGI, and a result CGI;

said arrangement module preparing an index URL, an action URL, and a result URL upon establishment of said intended advertisement contract;

said index URL identifying a URL of said index CGI and including an ad code assigned to the intended advertisement, said index URL being embedded in said ad space;

said action URL identifying a URL of said action CGI and being embedded in said entrance page, said result URL identifying a URL of said result CGI and being embedded in said action page;

said index CGI being linked to ad space through said index URL and to an index log file which stores index data with regard to the user requesting access to said entrance page, said index data including:

1) date and time of the user requesting access to said entrance page;

2) a referrer log showing data of at least said ad space from which the user makes the request for access to said entrance page of the web site; and 3) said ad code;

said arrangement module locating an entrance page URL of said entrance page based upon said ad code received at said index CGI by reference to a table storing various ad code in relation to various entrance page URLs, said arrangement module passing thus located entrance page URL to said index CGI which responds to redirect the user's request at said ad space to said entrance page immediately after storing said index data in said index log file;

said action CGI being linked said entrance page through said action URL and to an action log file which stores action access data with regard to the user requesting access to said action page, said action access date including:

1) date and time of the user requesting access to the action page; and 2) a referrer log showing data of at least said ad space from which the user is led to said action page;

said arrangement module locating an action page URL of said action page by collation of said data of the ad space received at said index CGI with data of the ad space received at said action CGI and by reference to said table storing the ad codes in relation to action page URLs, said arrangement module passing thus located action page URL to said action CGI which responds to redirect the user's request at said entrance page to said action page immediately after storing said action access data in said action log file;

said result CGI being linked to said action page through said result URL and to a result log file which stores action process data with regard to the user requesting the processing at said action process module, said action process date including 1) date and time of the user requesting an access to the action process module;

2) a referrer log showing data of at least said ad space from which the user is led to said action process module; and said arrangement module locating an action process URL of said action page by collation of said data of the ad space received at said index CGI with data of the ad space received at said result CGI and by reference to said table storing the ad codes in relation to action process URLs, said arrangement module passing thus located action process URL to said result CGI which responds to redirect the users request for access to said action process module immediately after storing said action process data in said result log file.

8. The system as set forth in claim 7, wherein said administration module produces said statistical report with reference to said index log file, said action log file, and said result log file.

9. The system as set forth in claim 8, wherein
said proceeder rate and said completer rate being listed on a daily basis.

10. The system as set forth in claim 8, wherein
said proceeder rate and said completer rate are listed per said ad code when different ad codes are assigned to different campaigns.

11. The system as set forth in claim 1, wherein said statistical report includes said page access number, said action access number, and said result number which are sorted on each ad code when more then one ad code is assigned to different campaigns.

12. The system as set forth in claim 9, wherein said statistical report includes a referrer table listing a ranking of the referred URLs that lead to the action process module through said entrance page and said action page.

13. A method of arranging the delivery of advertisements over a network, said method comprising the steps of:
providing an invitation page on the network, said invitation page inviting potential advertisers each advertiser of said potential advertisers to place an advertisement on the network, said each advertiser having a web site,
said invitation page having a condition form to specify conditions of said advertisement, said condition form having a list of defined responses expected to be made by a user of said network in reply to the advertisement so that the advertiser can select at least one of said defined responses, said at least one of said defined responses to be included in said conditions,
said condition form having a cost per response entry to be filled by the advertiser, said cost per response entry indicating a unit cost payable for the response selected,
said condition form having a media entry for designating a desired network medium on which the advertisement is intended to be placed;
receiving a reply to the invitation page from the advertiser and making therefrom an ad schedule with specific conditions for the advertisement;
providing an offer page, said offer page disclosing said ad schedule over the network to a potential affiliate so that the affiliate can determine to place the advertisement on an ad space of a network medium in agreement on the specific conditions in said ad schedule, said potential affiliate administering said network medium,
said offer page including an agreement entry, said agreement entry instructing the affiliate to enter an acceptance for selling the ad space to the advertiser;
establishing an advertisement contract between the advertiser and the affiliate immediately upon receipt of said acceptance and delivering a confirmation of the contract to the advertiser and the affiliate;
allocating the web site to said ad space in the network medium placing the advertisement in order to count the number of ad space responses made through said ad space to the web site during a predetermined period of time; and
delivering data of the counted ad space responses over the network for access by the advertiser as well as by the affiliate so that the advertiser can evaluate the effect of the advertisement and that the affiliate can charge the advertiser for the advertisement based upon said data,
wherein said web site includes an entrance page that is linked from said ad space, an action page that is linked from the entrance page and where the user may proceed to make at least one specific action of said defined responses, and an action process module that responds to said specific action for processing the same,
wherein said administer module produces the statistical report listing a page access number that is the number of the accesses to the entrance page of the web site during a predetermined period of time, an action access number that is the number of accesses to said action page, and/or a result number that is the number of the access to said action process module,
wherein the statistical report includes a proceeder rate, which is the ratio of the action access number to said page access number, and/or "completer" rate, which is the ratio of the result number to said page access number.

14. The method as set forth in claim 13, wherein s said defined respnse made by the users include:
clicking through to said web site downloading a file or software from the web site;
applying for a prize offered by the advertiser on the web site;
answering to a questionnaire from the advertiser on the web site;
requesting a catalogue from the advertiser through the web site;
requesting a subscription to a newsletter from the web site;
signing up a membership of a club managed by the advertisers through the web site; and
ordering a product or service through the web site.

15. The method as set forth in claim 13, wherein said clicking through to
said web site is excluded from said ad space responses to be paid.

16. The method as set forth in claim 13, wherein
said cost per response entry is programmed to receive different costs for differing responses selected by the advertiser.

17. The method as set forth in claim 13, wherein
said statistical report including a table showing a ratio of the number of the counted ad space responses to the number of visits to the web site.

18. The method as set forth in claim 13, wherein
said condition form has, in addition to said selection box and said cost per response entry, information entries to be entered by the advertiser for items which include:
campaign objective; maximum counts of responses per a predetermined period of time;
category of target group;

desired media;
requested advertising time period;
advertising content;
URL of the web site.

19. The method as set forth in claim 13, wherein
said response measurement module of the agents server being provided with:
an index CGI
an action CGI, and
a result CGI;
said arrangement module preparing:
an index URL,
an action URL, and
a result URL upon establishment of said advertisement contract;
said index URL identifying a URL of said index CGI and including an ad code assigned to the advertisement, said index URL being embedded in said ad space,
said action URL identifying a URL of said action CGI and being embedded in said entrance page,
said result URL identifying a URL of said result CGI and being embedded in said action page,
said index CGI being linked to ad space through said index URL and to an index log file which stores index data with regard to the user requesting access to said entrance page, said index data including:
1) date and time of the user requesting access to said entrance page;
2) a referrer log showing data of at least said ad space from which the user makes the request for access to said entrance page of the web site; and
3) said ad code;
said arrangement module locating an entrance page URL of said entrance page based upon said ad code by reference to a table storing various ad codes ad code in relation to various entrance page URLs, said arrangement module passing thus located entrance page URL to said index CGI which responds to redirect the user's request at said ad space to said entrance page immediately after storing said index data in said index log file;
said action CGI being linked said entrance page through said action URL and to an action log file which stores action access data with regard to the user requesting access to said action page, said action access data including:
1) date and time of the user requesting to the action page; and
2) a referrer log showing data of at least said ad space from which the user is led to said action page;
said arrangement module locating an action page URL of said action page by collation of said data of the ad space received at said index CGI with data of the ad space received at said action CGI and by reference to said table storing the ad codes in relation to various action page URLs, said arrangement module passing thus located action page URL to said action CGI which responds to redirect the user's request at said entrance page to said action page immediately after storing action access data in said action log file;
said result CGI being linked to said action page through said result URL and to a result log file which stores action process data with regard to the user requesting the processing at said action process module, said action process data including 1) date and time of the user requesting an access to the action process module; and
2) a referrer log showing data of at least said ad space from which the user is led to said action process module;
said arrangement module locating an action process URL of said action page by collation of said data of the ad space received at said index CGI with data of the ad space received at said result CGI and by reference to said table storing the ad codes in relation to various action process URLs, said
arrangement module passing thus located action process URL to said result CGI that responds to redirect the users request for access to said action process module immediately after storing said action process data in said result log file.

20. The method asset forth in claim 19, wherein
said administer module produces said statistical report with reference to said index log file, said action log file. and said result log file, said statistical report listing a page access number which is the number of the accesses to the entrance page of the web site during a predetermined period of time,
an action access number that is the number of accesses to said action page, and a result number that is the number of the access to said action process module.

21. The method as set forth in claim 20, wherein
said statistical report includes a proceeder rate, which is the ratio of the action access number to said page access number, and "completer" rate, which is the ratio of the result number to page access number, and said proceeder rate and said completer rate being listed on a daily basis.

22. The method as set forth in claim 20, wherein said statistical report includes a proceeder rate, which is the ratio of the action access number to said page access number, and "completer" rate, which is the ration of the result number to page access number, and said proceeder rate and said completer rate being listed per said ad code when different ad codes are assigned to different campaigns.

23. The method as set forth in claim 20, wherein
said statistical report includes said page access number, said action access number, and said result number which are sorted on each ad code when more than one ad code is assigned to different campaigns.

24. The method as set forth in claim 20, wherein said statistical report includes a referrer table listing a ranking of the referred URLs which lead to the action process module through said entrance page and said action page.

25. A system of arranging the delivery of advertisements over a network, an agent managing said system, said system having an agent's server that comprises:
an invitation module, said invitation module providing an invitation page on said network, said invitation page inviting a potential advertiser to place an intended advertisement on said network,
said advertiser having a web site,
said invitation page including a condition form, said advertiser providing at least one entry into said condition form to specify conditions of said intended advertisement,
said condition form having a selection box of defined responses to be made by a user of said network as a consequence of the intended advertisement so that the advertiser can select at least one of said defined responses at said selection box, said at least one of said defined responses to be included in said conditions, said condition form having a cost per response entry to be entered by the advertiser, said cost per response entry indicating a unit cost payable for the response selected;

an offer module, said offer module making an ad schedule listing the intended advertisement with the specific conditions, said specific conditions being based upon a reply to said invitation page from the advertiser, said offer module providing an offer page, said offer page disclosing said ad schedule on the network to a potential affiliate so that the affiliate can determine to place the intended advertisement on an ad space of a network medium in agreement on the specific conditions prescribed in said ad schedule, said affiliate administering said network medium, said offer page including an agreement entry, said agreement entry instructing the affiliate to enter an acceptance for selling the ad space to the advertiser;

an arrangement module, said arrangement module establishing an advertisement contract between the advertiser and the affiliate upon receipt of said acceptance from the affiliate, said arrangement module allocating said web site to said ad space of said network by placing the intended advertisement thereon;

a response measurement module, said response measurement module counting the number of specific responses made at the web site through said ad space; and an administration module, said administration module making a statistical report for analysis of the counted responses and delivering the statistical report through said agent's server to the advertiser so that the advertiser can estimate the effectiveness of the intended advertisement, wherein said response measurement module of the agent's server being provided with an index CGI, an action CGI, and a result CGI;

said arrangement module preparing an index URL, an action URL, and a result URL upon establishment of said intended advertisement contract;

said index URL identifying a URL of said index CGI and including an ad code assigned to the intended advertisement, said index URL being embedded in said ad space;

said action URL identifying a URL of said action CGI and being embedded in said entrance page, said result URL identifying a URL of said result CGI and being embedded in said action page;

said index CGI being linked to ad space through said index URL and to an index log file which stores index data with regard to the user requesting access to said entrance page, said index data including:
1) date and time of the user requesting access to said entrance page;
2) a referrer log showing data of at least said ad space from which the user makes the request for access to said entrance page of the web site; and
3) said ad code;

said arrangement module locating an entrance page URL of said entrance page based upon said ad code received at said index CGI by reference to a table storing various ad code in relation to various entrance page URLs, said arrangement module passing thus located entrance page URL to said index CGI which responds to redirect the user's request at said ad space to said entrance page immediately after storing said index data in said index log file;

said action CGI being linked said entrance page through said action URL and to an action log file which stores action access data with regard to the user requesting access to said action page, said action access data including:
1) date and time of the user requesting access to the action page; and
2) a referrer log showing data of at least said ad space from which the user is led to said action page, said arrangement module locating an action page URL of said action page by collation of said data of the ad space received at said index CGI with data of the ad space received at said action CGI and by reference to said table storing the ad codes in relation to action page URLs, said arrangement module passing thus located action page URL to said action CGI which responds to redirect the user's request at said entrance page to said action page immediately after storing said action access data in said action log file;

said result CGI being linked to said action page through said result URL and to a result log file which stores action process data with regard to the user requesting the processing at said action process module, said action process data including
1) date and time of the user requesting an access to the action process module;
2) a referrer log showing data of at least said ad space from which the user is led to said action process module; and said arrangement module locating an action process URL of said action page by collation of said data of the ad space received at said index CGI with data of the ad space received at said result CGI and by reference to said table storing the ad codes in relation to action process URLs, said arrangement module passing thus located action process URL to said result CGI which responds to redirect the user's request for access to said action process module immediately after storing said action process data in said result log file, wherein said administration module produces said statistical report with reference to said index log file, said action log file, and said result log file, wherein the statistical report includes a proceeder rate, which is the ratio of the action access number to said page access number, and completer rate, which is the ratio of the result number to said page access number.

26. A method of arranging the delivery of advertisements over a network such as the Internet, said method comprising the steps of:

providing an invitation page on the network, said invitation page inviting potential advertisers each advertiser of said potential advertisers to place an advertisement on the network, said each advertiser having a web site, said invitation page having a condition form to specify conditions of said advertisement, said condition form having a list of defined responses expected to be made by a user of said network in reply to the advertisement so that the advertiser can select at least one of said defined responses, said at least one of said defined responses to be included in said conditions, said condition form having a cost per response entry to be filled by the advertiser, said cost per response entry indicating a unit cost payable for the response selected, said condition form having a media entry for designating a desired network medium on which the advertisement is intended to be placed;

receiving a reply to the invitation page from the advertiser and making therefrom an ad schedule with specific conditions for the advertisement;

providing an offer page, said offer page disclosing said ad schedule over the network to a potential affiliate so that the affiliate can determine to place the advertisement on an ad space of a network medium in agreement on the specific conditions in said ad schedule, said potential affiliate administering said network medium, said offer page including an agreement entry, said agreement entry instructing the affiliate to enter an acceptance for selling the ad space to the advertiser;

establishing an advertisement contract between the advertiser and the affiliate immediately upon receopt of said acceptance and delivering a confirmation of the contract to the advertiser and the affiliate;

allocating the web site to said ad space in the network medium placing the advertisement in order to count the number of ad space responses made through said ad space to the web site during a predetermined period of time; and delivering data of the counted ad space responses over the network for access by the advertiser as well as by the affiliate so that the advertiser can evaluate the effect of the advertisement and that the affiliate can charge the advertiser for the advertisement based upon said data, wherein said response measurement module of the agent's server being provided with:
an index CGI,
an action CGI, and
a result CGI;

said arrangement module preparing:
an index URL,
an action URL, and
a result URL upon establishment of said advertisement contract;

said index URL identifying a URL of said index CGI and including an ad code assigned to the advertisement, said index URL being embedded in said ad space, said action URL identifying a URL of said action CGI and being embedded in said entrance said result URL identifying a URL of said result CGI and being embedded in said action page;

said index CGI being linked to ad space through said index URL and to an index log file which stores index data with regard to the user requesting access to said entrance page, said index data including:
1) date and time of the user requesting access to said entrance page;
2) a referrer log showing data of at least said ad space from which the user makes the request for access to said entrance page of the web site; and
3) said ad code;

said arrangement module locating an entrance page URL of said entrance page based upon said ad code by reference to a table storing various ad codes ad code in relation to various entrance page URLs, said arrangement module passing thus located entrance page URL to said index CGI which responds to redirect the user's request at said ad space to said entrance page immediately after storing said index data in said index log file;

said action CGI being linked said entrance page through said action URL and to an action log file which stores action access data with regard to the user requesting access to said action page, said action access data including:
1) date and time of the user requesting access to the action page; and
2) a referrer log showing data of at least said ad space from which the user is led to said action page;

said arrangement module locating an action page URL of said action page by collation of said data of the ad space received at said index CGI with data of the ad space received at said action CGI and by reference to said table storing the ad codes in relation to various action page URLs, said arrangement module passing thus located action page URL to said action CGI which responds to redirect the user's request at said entrance page to said action page immediately after storing said action access data in said action log file;

said result CGI being linked to said action page through said result URL and to a result log file which stores action process data with regard to the user requesting the processing at said action process module, said action process data including:
1) date and time of the user requesting an access to the action process module; and
2) a referrer log showing data of at least said ad space from which the user is led to said action process module;

said arrangement module locating an action process URL of said action page by collation of said data of the ad space received at said index CGI with data of the ad space received at said result CGI and by reference to said table storing the ad codes in relation to various action process URLs, said arrangement module passing thus located action process URL to said result CGI that responds to redirect the user's request for access to said action process module immediately after storing said action process data in said result log file, wherein an administration module produces a statistical report with reference to said index log file, said action log file, and said result log file, wherein the statistical report includes a proceeder rate, which is the ratio of the action access number to said page access number, and completer rate, which is the ratio of the result number to said page access number.

\* \* \* \* \*